(12) United States Patent
Egan

(10) Patent No.: US 6,327,643 B1
(45) Date of Patent: Dec. 4, 2001

(54) SYSTEM AND METHOD FOR CACHE LINE REPLACEMENT

(75) Inventor: Kenneth William Egan, Austin, TX (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/163,921

(22) Filed: Sep. 30, 1998

(51) Int. Cl.[7] ................................................. G06F 12/00
(52) U.S. Cl. ........................... 711/134; 711/136; 711/160
(58) Field of Search .................................. 711/133, 134, 711/136, 159, 160, 156

(56) References Cited

U.S. PATENT DOCUMENTS 5,611,071 * 3/1997 Martinez, Jr. ......................... 711/133
5,636,355 * 6/1997 Ramakrishnan et al. ............ 711/113
5,737,751 * 4/1998 Patel et al. ............................ 711/133
5,887,152 * 3/1999 Tran ...................................... 712/217

* cited by examiner

Primary Examiner—Matthew Kim
Assistant Examiner—Matthew D. Anderson
(74) Attorney, Agent, or Firm—Kelly K. Kordzik; Winstead Sechrest & Minick P.C.; Leslie A. Van Leeuwen

(57) ABSTRACT

A cache replacement algorithm improves upon a least recently used algorithm by differentiating between cache lines that have been written with those that have not been written. The replacement algorithm attempts to replace cache lines that have been previously written back to memory, and if there are no written cache lines available, then the algorithm attempts to replace cache lines that are currently on page and on bank.

9 Claims, 10 Drawing Sheets

FIG. 8

SYSTEM AND METHOD FOR CACHE LINE REPLACEMENT

TECHNICAL FIELD

The present invention relates in general to data processing systems, and in particular, to an operation of cache memory.

BACKGROUND INFORMATION

A cache memory can be constructed in many ways. Initially, the cache is empty, and the cache elements can be conceived as having pointers to the beginning and the end of the cache. These pointers are referred to as the head and tail pointers. The head pointer points to the next available cache line (newest), whereas the tail pointer points to the beginning, or oldest cache line within the cache. As rasterization of a display occurs, the head pointer is incremented as cache misses occur, until the cache fills. Then, the head pointer wraps to the beginning or oldest cache line, and the tail pointer is incremented. This concept is referred to as a circular buffer.

A cache line has associated tags, which track to memory pages, banks, and discreet memory locations within each page/bank group. As prefetching or cache misses occur, current or subsequent cache items may actually point to memory locations with no spatial coherence to each other (i.e., on different memory pages/addresses).

Using an LRU approach, cache line replacement would be forced to incur a page access, possibly degrading system memory performance while the memory subsystem starts the new (or old) cache memory page. This problem might be exaggerated if the cache line to be replaced must first be written out, and it is on a totally different memory page. The system performance degradation is due to the time associated with memory page crossings.

Therefore, there is a need in the art for an improved cache line replacement technique, which improves upon the prior art LRU method.

SUMMARY OF THE INVENTION

The present invention addresses the foregoing need by differentiating between cache lines that have been written with those that have not. Replacement selection begins with a determination if the cache is full. If not full, the cache line indicated by the LRU head pointer is filled. If the cache is full, then the oldest cache line that has been written back is replaced (LRU). If no unwritten cache lines are available (all cache lines are dirty), the oldest cache line that meets pipeline temporality criteria and is currently on page and on bank is written back and replaced. If there are no cache lines available that meet the above criteria, then the cache line indicated by the tail (LRU) pointer is replaced, and the system incurs a page access penalty.

This process is used for cache misses occurring during a prefetch access and for write mode accesses.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 8 illustrates pages and banks within a cache memory;

DETAILED DESCRIPTION

Figure 1:
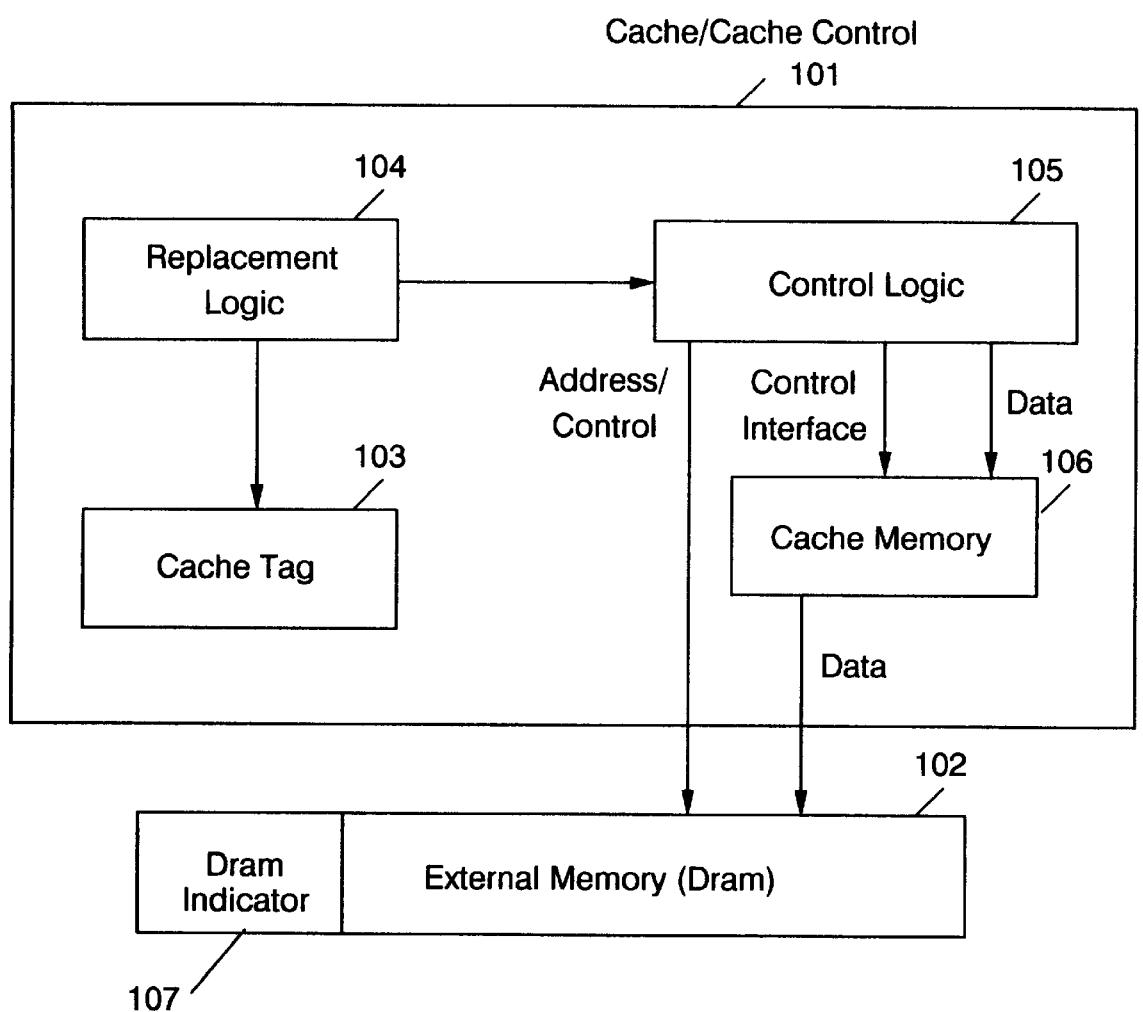
FIG. 1 illustrates a cache memory architecture configured in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 7:
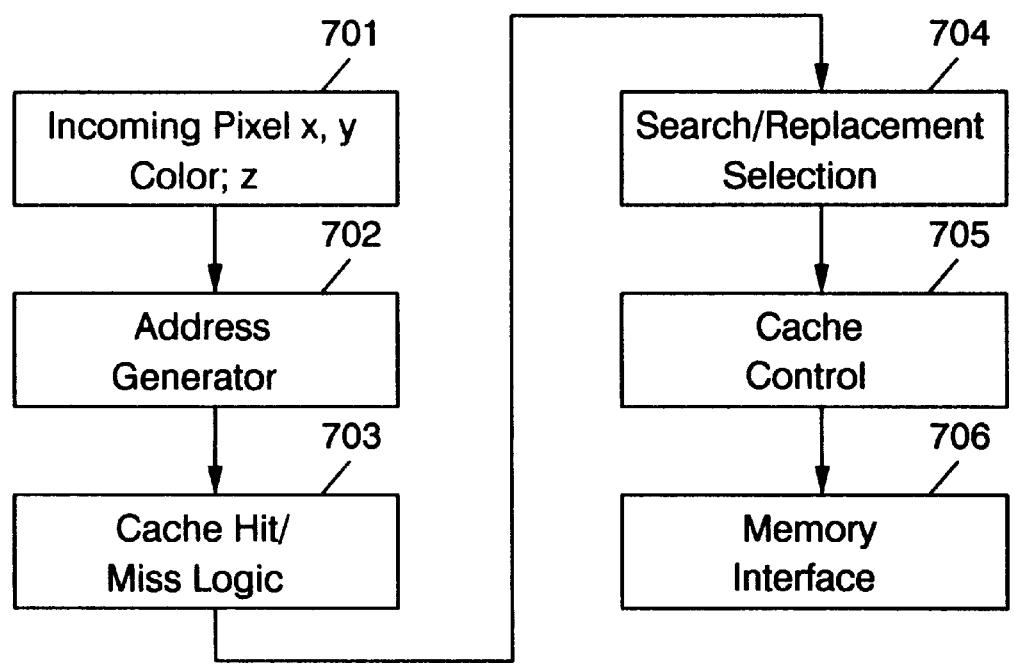
FIG. 7 illustrates a flow diagram configured in accordance with the present invention.

Referring to FIG. 7, when the display system begins to render an image, the pixel coordinates, X and Y, which are directly related to where the image will be rendered on the screen, will be received in block 701 and processed through an address generator 702. From there, these pixels go through a cache hit/miss logic 703 which determines whether that pixel is available in the cache 106. From there, the present invention searches for the best cache line to utilize for given scenarios (block 704). Those signals which choose the best cache line are processed through cache control 705, which interfaces with the physical memory device 102 through the memory interface 706, which include the signal drivers. The address generator 702 utilizes the X,Y screen coordinates and calculates the actual physical memory page, the bank and the sub-block to that page/bank group as long as there is a corresponding tag to the block of memory.

Figure 8:
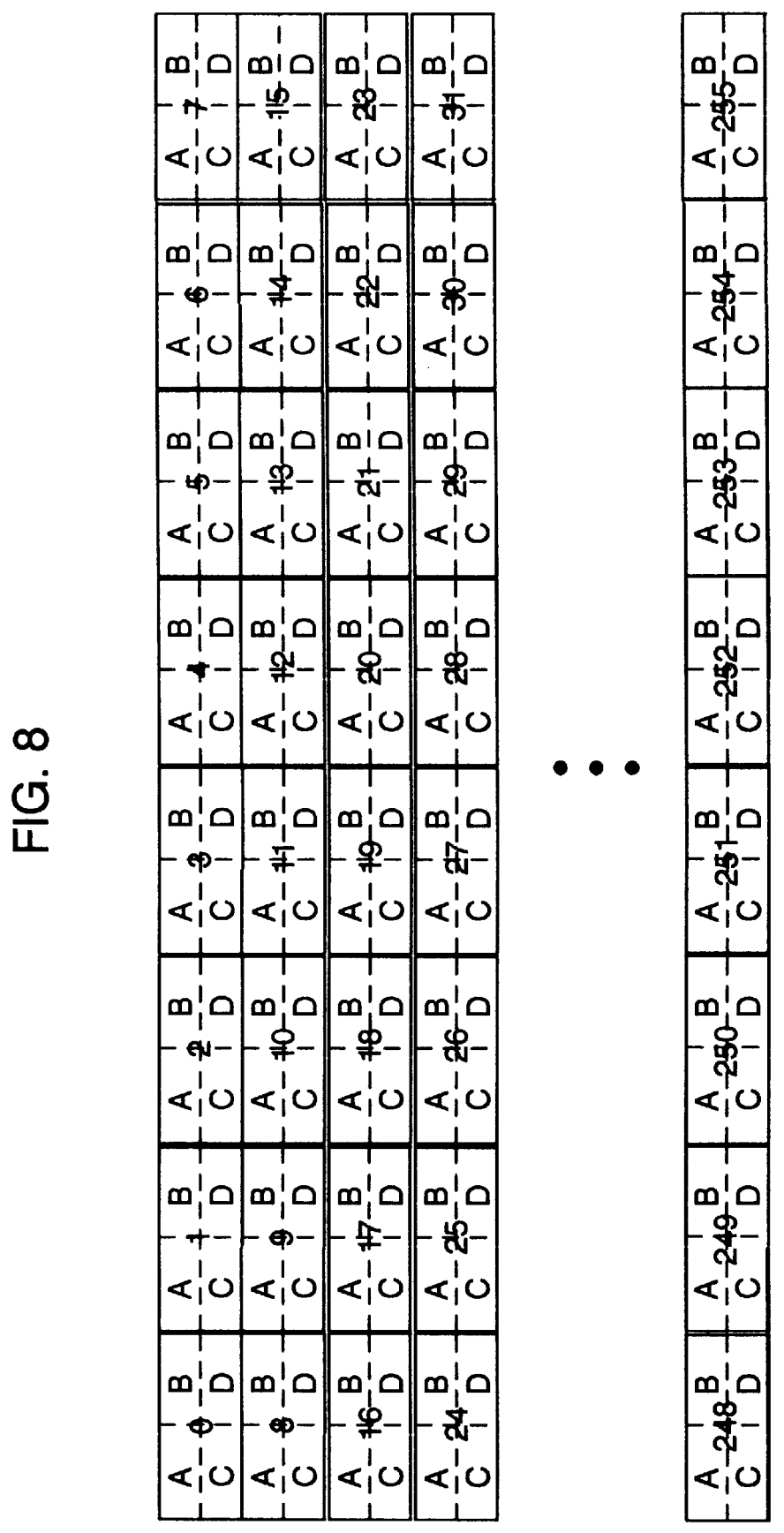

In FIG. 8, the frame buffer 102 is comprised of 255 separate pages, each page having four banks associated with it. Those four banks in each page are indicated by letters A, B, C, and D.

Figure 2:
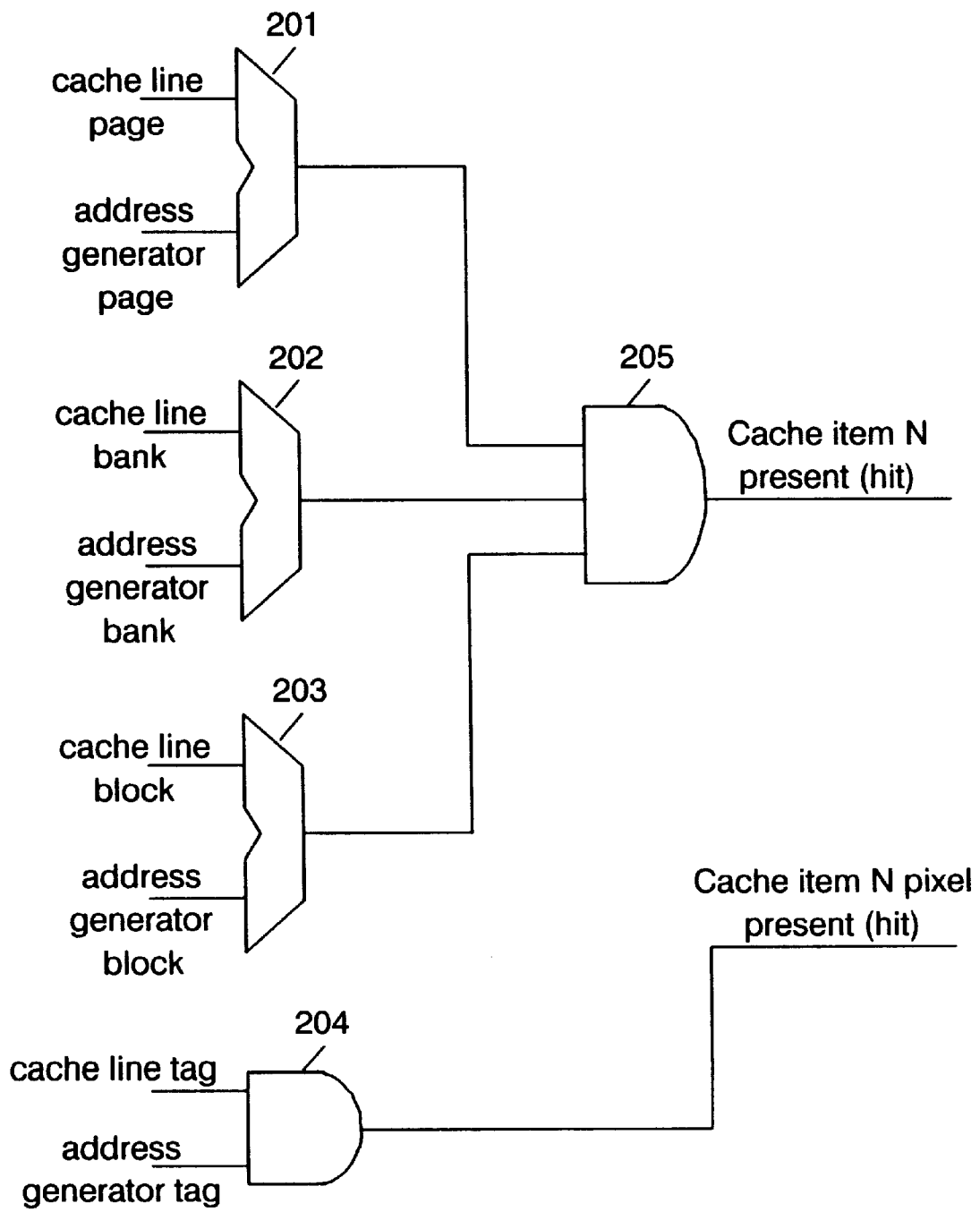
FIG. 2 illustrates circuitry for determining a cache hit or miss in accordance with the present invention.

Referring to FIG. 2, in the cache hit/miss logic 703, the incoming pixel address from the address generator 702 is then compared to the numeration of cache lines. The address coming from the address generator 702 branches off for each cache line. Each cache line has an associated page and bank in its tag area.

Comparators 201, 202, and 203 compare the address generator page, bank and block to each specific cache line's page, bank and block. Those are ANDed together in AND gate 205 so there will only be one unique hit. In other words, there are never multiple cache lines with the same page, the same bank, and the same block address. If all of those signals are present, then this is a cache line hit, and AND gate 205 will output an asserted signal. In addition, AND gate 204 compares the cache line tag information with the address generator tag to determine whether the pixel in the block is presently generating a pixel present, or pixel hit signal.

Figure 6:
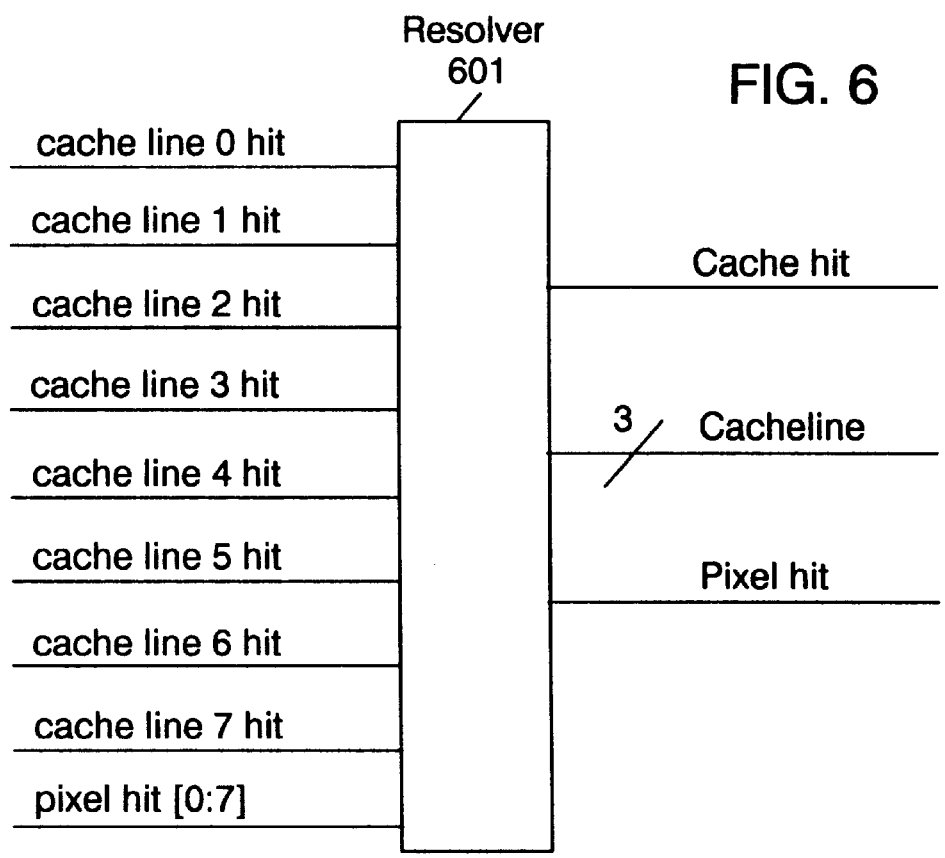
FIG. 6 illustrates decoding of each cache hit/miss signal.

Referring now to FIG. 6, for N available cache lines, the signals from AND gates 204, 205 enter a resolver circuit 601 that decodes one of N. In this example, only 8 cache lines are shown (8 signals coming in for cache line hits and an additional 8 signals that determine a pixel hit for that cache line). The resolver 601 then decodes these signals and reduces it down to a cache hit signal. The pixel hit signal determines for that particular cache line that the pixel is in that block. The cache hit signal will only be asserted if there is a cache hit somewhere within one of those cache lines. And the pixel hit signal will only be asserted if there is actually a pixel hit in one of the cache lines that is being compared. The 3-bit cache line signal indicates which of those cache lines has that cache hit and that pixel hit.

Figure 3:
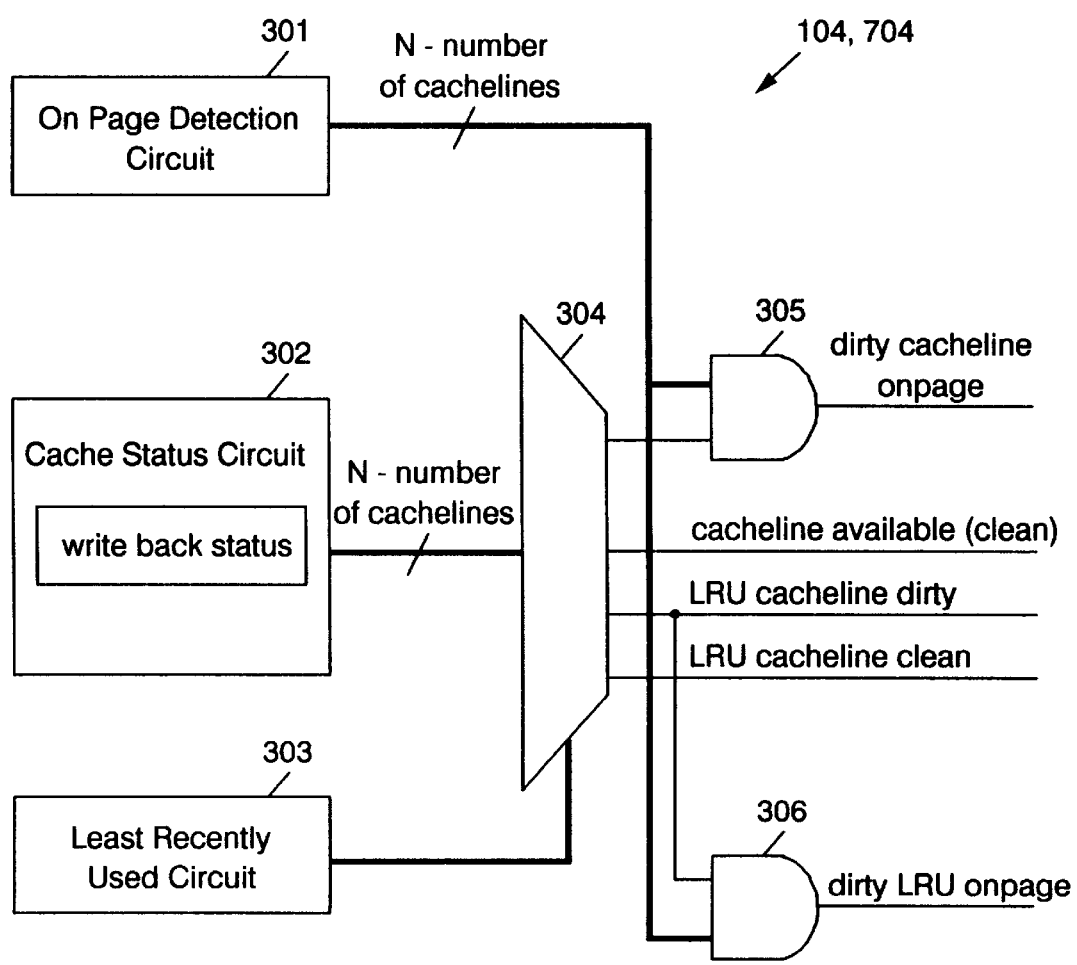
FIG. 3 illustrates further detail of the replacement logic within cache/cache control 101.
Figure 9:
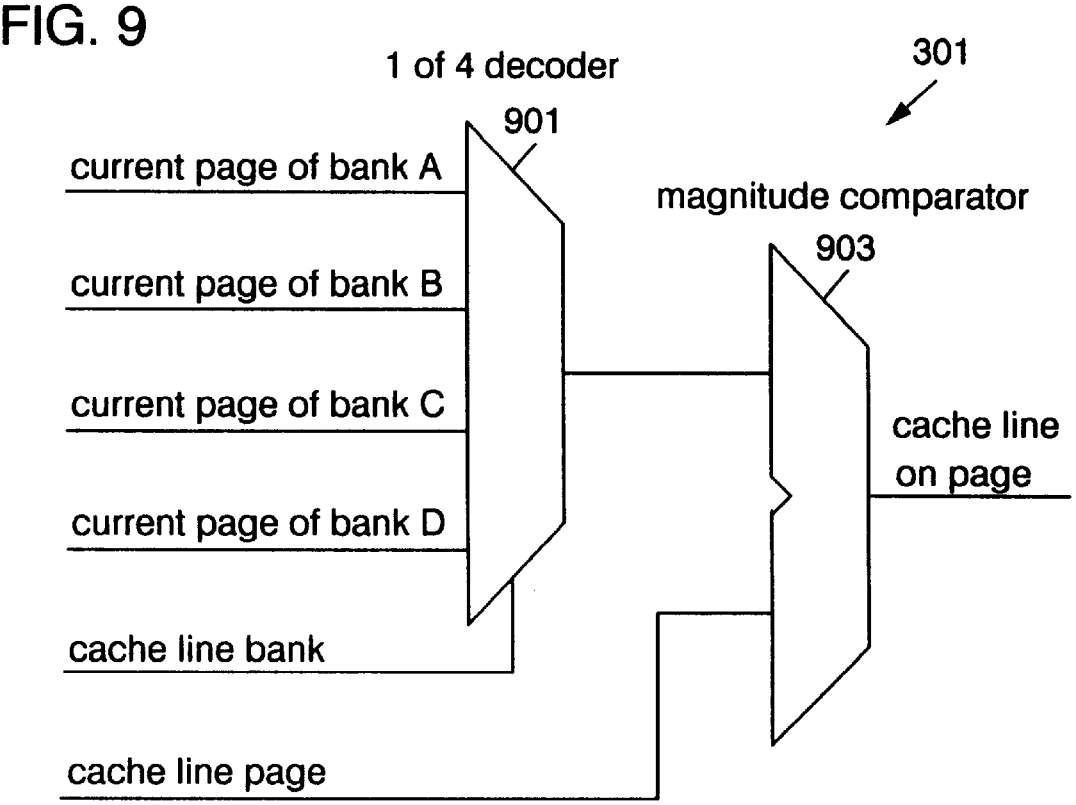
FIG. 9 illustrates further detail of on-page detection circuit 301.

Referring next to FIG. 3, which shows further detail of replacement logic 104 (block 704 in FIG. 7), block 301 is the on page detection circuit, which is illustrated in more detail in FIG. 9. Memory accesses are split into one of four different banks (see FIG. 8). Every access to the frame buffer is made to either bank A, bank B, bank C, or bank D. Cache line information that determines which bank and which page goes through one of four decoders 901 which select which is the current bank from the status register. The current bank is selected and goes through a magnitude comparator 903 and is compared to the cache line page information. If the cache line page is equivalent to the current page of a specific bank, then we resolve that the cache line is on page. Cache line page is part of tag information. Current page/bank is latched information from last page access command.

Referring back to FIG. 3, cache status circuit 302 is a single bit that determines whether that block has been written back to memory. There will be N writeback signals each corresponding to a cache line. For example, for an 8 cache line system, there will be 8 writeback signals. That may be implemented with a compare (ANDing with a 1). A writeback of 1 indicates that block is dirty and needs to be written back. Those signals from circuit 302 are all sent to a mux 304, which will resolve which specific cache line. AND gate 305 for every cache line determines whether that cache line is dirty (writeback status of 1) and 8 signals are resolved that determine whether the cache line is on page and needs to be written down. There are also 8 signals that determine whether the writeback is 0, in other words, it is available to be replaced.

Each cache unit has a temporal tag, which indicates when the cache line was last used. Least recently used (LRU) circuit 303 indicates which cache line has been least recently used and is implemented by comparing every cache line against every other cache line. There is a time associated with every cache line. The time for cache line 0 is checked against every other cache line; cache line 1 against every other cache line, etc.

AND gate 306 is an AND of the oldest dirty cache line (dirty LRU) and whether it is on page.

Figure 4:
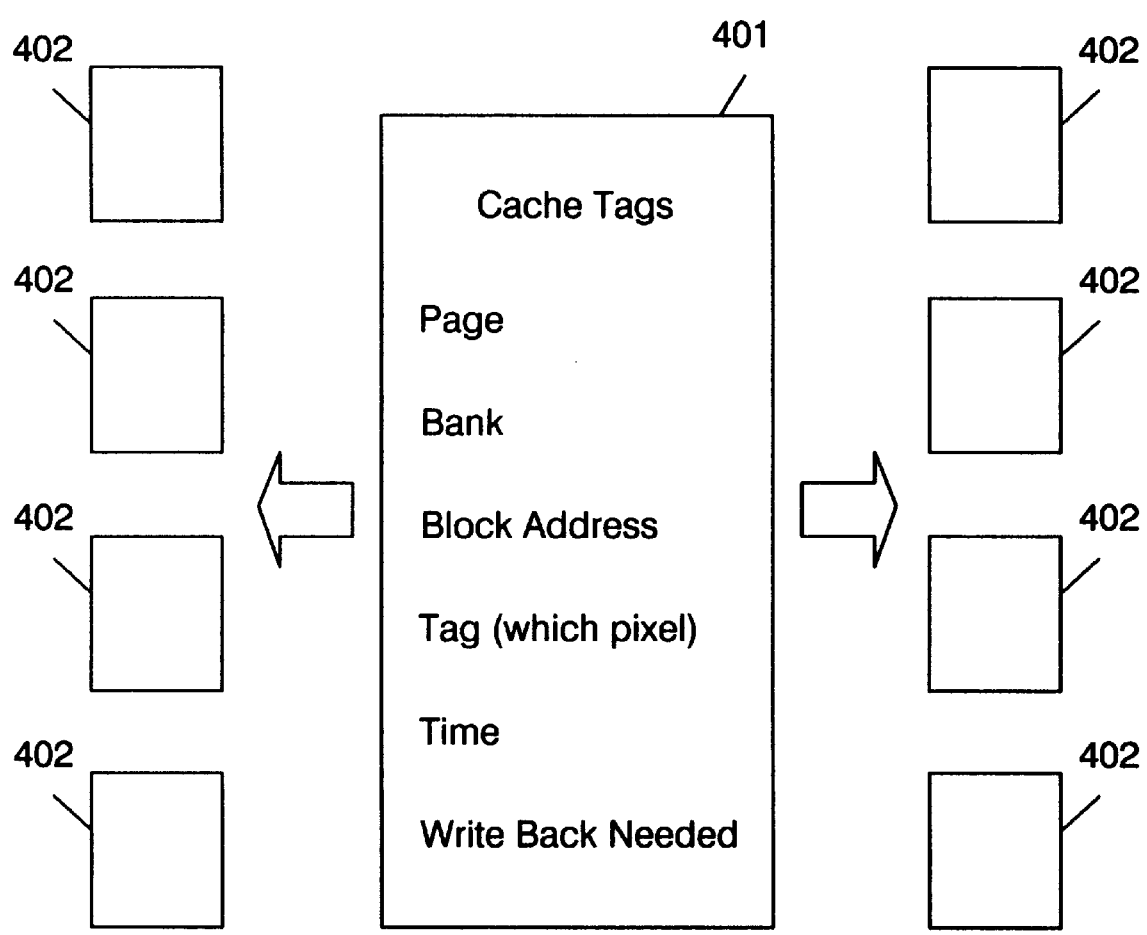
FIG. 4 illustrates information stored with each cache line.

Referring to FIG. 4, each cache line 402 has an associated number of tags 103 or information about that cache block indicating which page the cache line 402 is on, which bank (i.e. referring to FIG. 8 the page is going to be 0–255, the bank is either going to be A, B, C, or D), the block address (little sub-blocks) have the tag, and the tag is which one of 8 pixels within each cache block. Each bank A, B, C, or D is divided up into a number of blocks, e.g., 40, and each block is comprised of a number of pixels, e.g., 8. The tag indicates which pixel in that sub-block of which is 1 of 8. Also associated is the time or how long that cache line has been idle, and whether that cache line has been written back to main memory.

Figure 10:
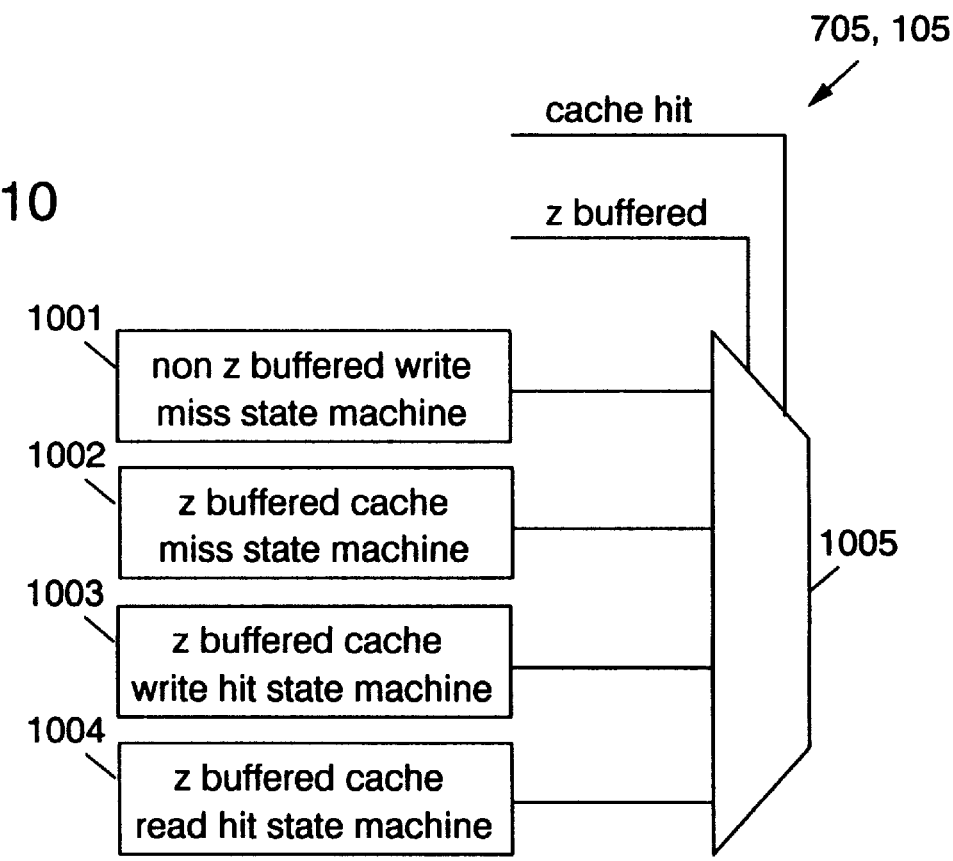
FIG. 10 illustrates further detail of the cache control logic.

Referring back to FIG. 7, the cache control logic 705 is further illustrated in FIG. 10. Block 1001 is the non-Z buffered write miss state machine. In other words, there was a cache miss and it was non-Z buffered. Block 1002 is the Z buffered cache miss state machine and there was a cache miss and it was Z buffered, regardless of whether it was write or read. Block 1003 is the Z buffered cache write hit state machine which handles the situation when there was a cache hit and it was Z buffered. Block 104 is a state machine that handles the situation when there was a cache read hit of a pixel and it is Z buffered.

Z buffered means there is three dimensional information. Not only are there X,Y coordinates, but also Z coordinates (depth into the picture display).

The cache memory controller 105, 705 in FIG. 10, i.e., blocks 1001–1004 utilize the information presented in the replacement selection circuit 104, 704 and the hit/miss logic 703. They resolve those signals, choose the best scenario based on those signals, and control the memory 102, 106, i.e., what page and bank, what particular cache line, whether on page or off page, as well as whether that cache line values writeback as 1 or 0.

Figure 11:
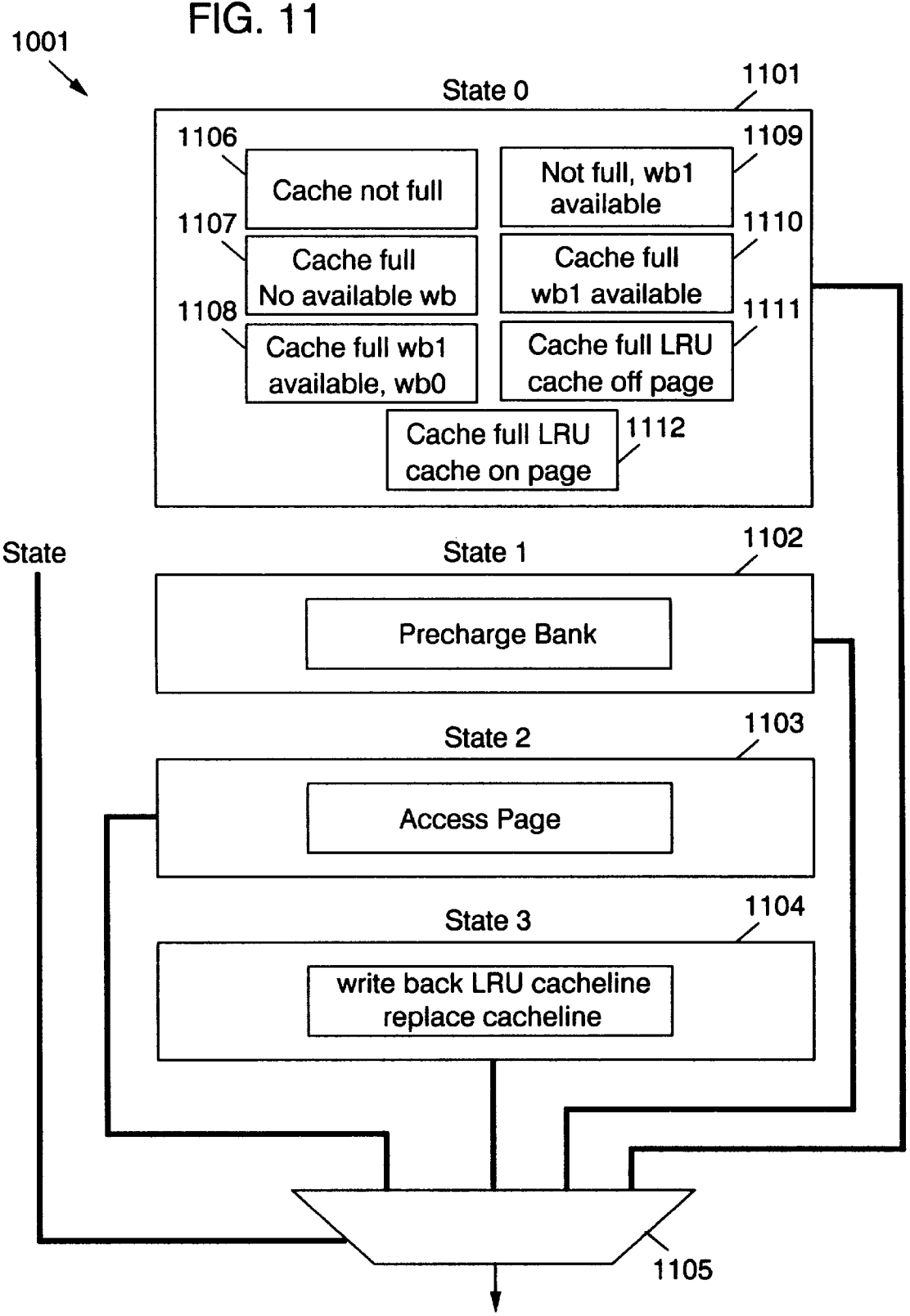
FIG. 11 illustrates further detail of the non-Z buffered write miss state machine.

Logic 705 will only attempt to do memory accesses to the current page (on page); the least desirable scenario is having to change pages. Referring now to FIG. 11, state machine 1001 is further described. There are 5 signals that feed state machine 1001: (1) cache full status; (2) cache line whose writeback value is 0; (3) cache line is on page and can be written back; (4) current writeback status of the LRU cache line; and (5) whether the incoming pixel is on or off page. If the cache 106 is not full 1106, the cache line utilized is the next available unused cache line. When the cache is full and there is no available writeback scenario 1107 indicates the cache is full or either for reasons all the cache lines are off page. Since all cache lines are off page, the least recently used cache line is going to be used and the state machine 1001 changes to State 1 1102, where the memory 102 has to precharge the specific bank for that cache line. The process would then go to State 2 1103, where the memory 102 accesses the new page with that specific cache line's page bank. From there the process goes to State 3 1104 to write back the least recently used cache line and replace it with the new information. It may be noted that between transition 1103 and 1104, if there is a cache line whose writeback is 1 and on page, it will be written back.

In scenario 1108, the cache line cache is full and dominated by two signals -one that indicates there is a cache line whose writeback value is 1 and is on page, and there is also a cache line whose writeback status is zero. Two operations occur simultaneously; the cache line whose writeback is 0 is replaced with the new data and at the same time the process attempts to write back the cache line whose writeback is 1 and it is on page.

Scenario 1109 occurs when the cache is not full and there is a signal indicating that there is a cache line whose writeback is 1 and is on page. The new pixel will be stored into the next available cache line that is not being used since it is not full. Simultaneously, the process will attempt to write back a cache line whose writeback was 1 since it is on page. Scenario 1110 is similar to 1108 except there is only one signal available. The cache is full and there is an available cache line that needs to be written back. The process attempts to write back the cache line whose writeback is 1. The process replaces the tags with the new pixel information.

In scenario 1111, the cache is full. There are no other signals indicating whether there is a cache line on page, so the process defaults to a least recently used algorithm. Since the cache line is off page, the process proceeds to State 1 where memory 102 precharges its bank. In State 2 memory 102 accesses its page (1103) and in State 3 1104 the process write backs that least recently used cache line memory and replaces the tags for that specific cache line.

In scenario 1112 the cache is full, there are no available signals, except the least recently used cache line and it is on page. The process writes back the least recently used cache line and replaces this information in the cache line tag.

Returning to FIG. 10, blocks 1003 and 1004 deal with cache hits and there is no real replacement occurring. Since there is a hit in the cache, there is no need for the replacement algorithm in the present invention.

For the Z buffered cache misses 1002, there are two separate scenarios: a cache miss, i e., cache line tag information which indicates the page and bank are not there (in other words, it is a total miss) or a partial hit (in other words, the cache line for incoming pixels page, bank and block, there is a cache line present; however, the pixel and the sub-block can be missing. This is considered a miss because that particular pixel is needed to do Z buffered tests.

Figure 12:
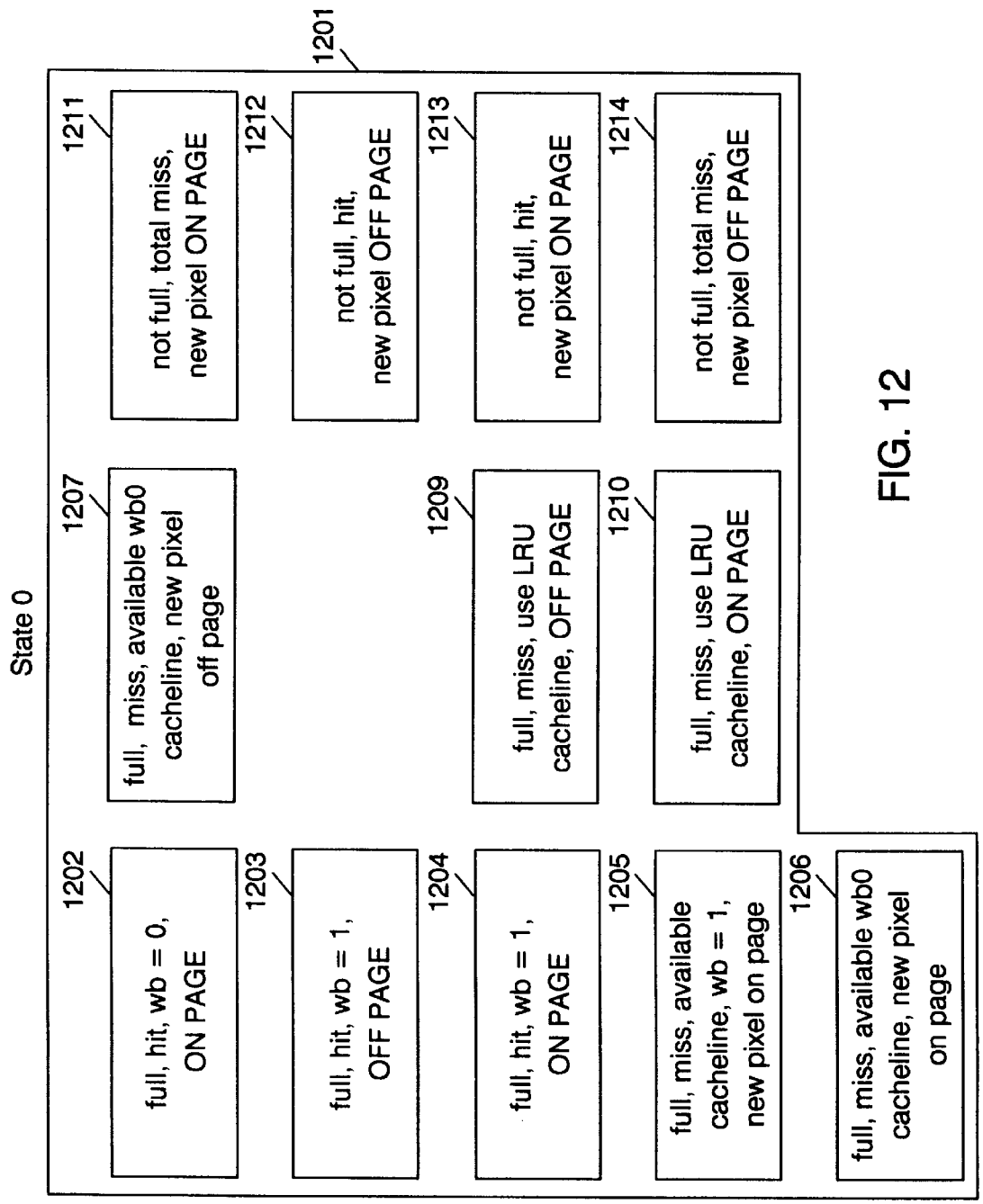
FIG. 12 illustrates further detail of a portion of the Z buffered cache miss state machine.

For a further discussion of state machine 1002, refer now to State 0 1201 in FIG. 12. Scenario 1202 is when the cache 106 is full and there is a cache hit. In other words, the cache is available. However, it is a pixel miss, but that specific cache line has a writeback flag of zero and it is on page. Subsequently, the pertinent sub-block is read from memory 102, scenario 1203 indicates a cache hit, but the pixel is a miss. Its writeback flag is 1 and it is off page. This is the worst case scenario. The cache line's page is accessed and written back before replacing/updating the tag information for the new pixel.

In scenario 1204, the cache is full, it is a cache hit, but a pixel miss again. The writeback is 1 and is on page. The process writes back that cache line and reads the same block into the same cache line.

In scenario 1205, the cache 106 is full and there is a total cache miss. It is both a pixel miss and a cache miss. There is a cache line available that is on page whose writeback is 1. The process would write back the old cache line and read in the new block, and replace the cache tags.

In scenario 1206, this is a full miss where there is no cache line (a cache miss as well as a pixel miss). There is an available cache line that is on page whose writeback is 0 and the incoming pixel is on page. The process replaces that one by a read from the memory 106.

In scenario 1207, cache line is full and there is a total miss. There is an available cache line whose writeback is 0. However, the new pixel is off page. Therefore, the process has to go through State 1–3 as described above with respect to FIG. 11.

In scenario 1209 the cache 106 is full, there is a cache miss and there is no available information for any other cache line. States 1–3 (FIG. 11) have to be processed.

In scenario 1210, cache 106 is full and there is a total cache miss. There is no available cache line. Therefore, the process has to again default to the least recently used cache line, which is on page and whose writeback status is a '1'. Therefore, the process writes back to the cache line. A read occurs replacing the LRU cache line and its associated tags.

In scenario 1211, the cache 106 is not full and there is a total cache miss. The new pixel is on page so the next available cache line is selected, the appropriate block read.

In scenario 1212, the cache 106 is not full, there is a cache line hit but a pixel miss. And the new incoming pixel is off page. States 1–3 in FIG. 11 are processed.

In scenario 1213 the cache 106 is not full and there is a cache hit but a pixel miss and the new pixel is on page. First the process has to write back the cache line and then read it back in and replace it.

Scenario 1214 is similar to scenario 1212 in that the cache 106 is not full, there is a total miss, and the new pixel is off page. States 1–3 show in FIG. 11 have to be processed. The replacement cache line is the next unused cache line.

Returning to FIG. 7, memory interface 706 takes the signals from cache control 705 which is the address and page and actually outputs them to the actual physical memory device.

Figure 5:
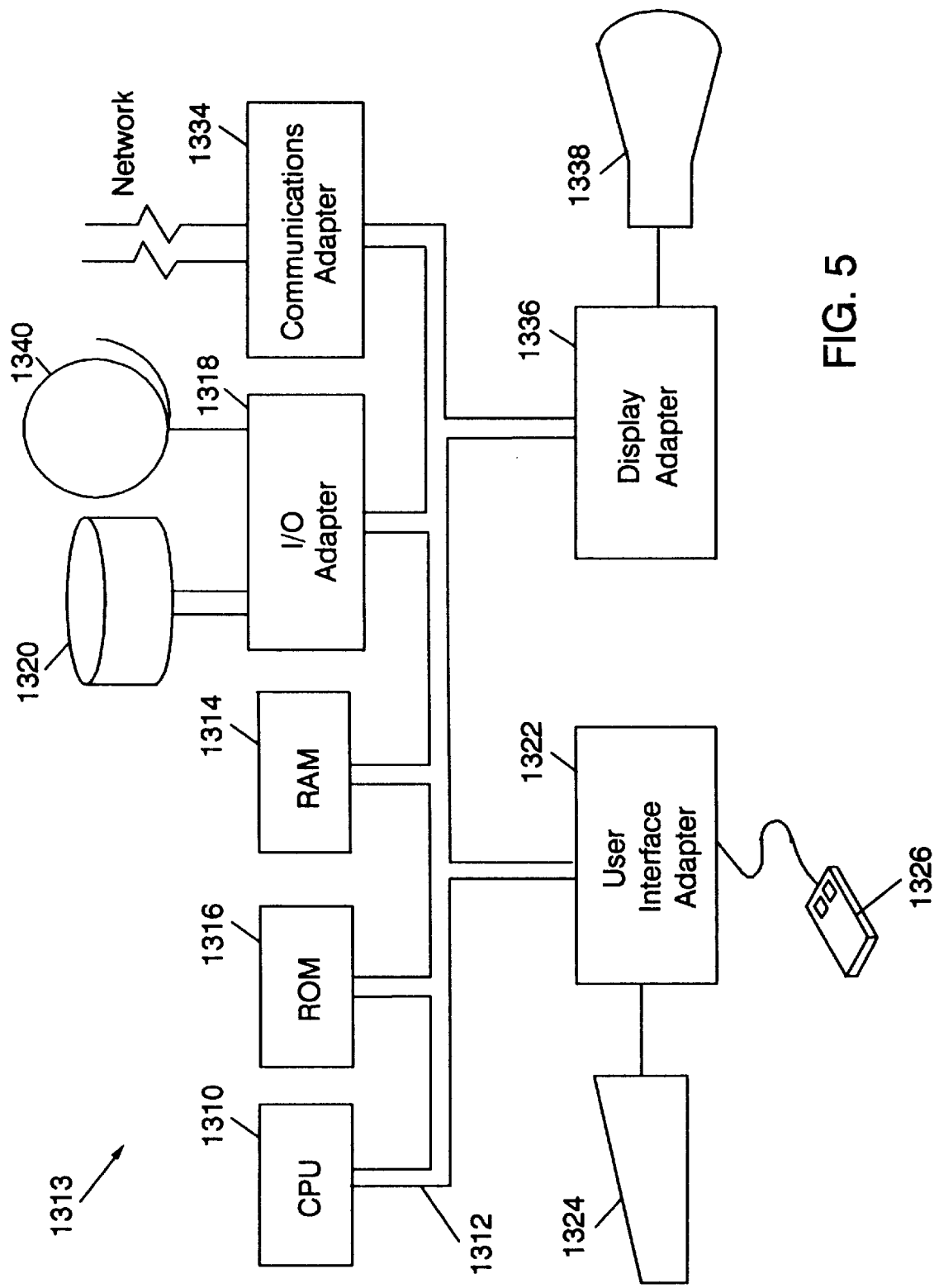
FIG. 5 illustrates a data processing system configured in accordance with the present invention.

A representative hardware environment for practicing the present invention is depicted in FIG. 5, which illustrates a typical hardware configuration of workstation 1313 in accordance with the subject invention having central processing unit (CPU) 1310, such as a conventional microprocessor, and a number of other units interconnected via system bus 1312. Workstation 1313 includes random access memory (RAM) 1314, read only memory (ROM) 1316, and input/output (I/O) adapter 1318 for connecting peripheral devices such as disk units 1320 and tape drives 1340 to bus 1312, user interface adapter 1322 for connecting keyboard 1324, mouse 1326, and/or other user interface devices such as a touch screen device (not shown) to bus 1312, communication adapter 1334 for connecting workstation 1313 to a data processing network, and display adapter 1336 for connecting bus 1312 to display device 1338. CPU 1310 may include other circuitry not shown herein, which will include circuitry commonly found within a microprocessor, e.g., execution unit, bus interface unit, arithmetic logic unit, etc. CPU 1310 may also reside on a single integrated circuit.

CPU 1310 or the processing elements in display adaptor 1336 may be coupled to cache/cache control 101.

Although the present invention and its advantages have been described in detail, it should be understood that various changes, substitutions and alterations can be made herein without departing from the spirit and scope of the invention as defined by the appended claims.

What is claimed is:

1. A method for replacing a cache line in a cache comprising the steps of:
   determining which cache line in the cache is both the oldest and not dirty;
   replacing that cache line determined to be both the oldest and not dirty; and
   if all cache lines in the cache are dirty, replacing the oldest cache line in the cache that is currently on page.

2. The method as recited in claim 1, further comprising the step of:

if all the cache lines are not dirty and not on page, replacing the least recently used cache line.

3. The method as recited in claim 1, further comprising the steps of:

determining if the cache is full; and if the cache is not full, filling in an empty cache line slot in the cache with a new cache line.

4. The method as recited in claim 1, further comprising the step of comparing addresses of the cache lines in the cache with a new cache line address to determine if there is a cache hit or cache miss.

5. A data processing system comprising:

a processor initiating a replacement of cache line in a cache coupled to the processor with a new cache line;

replacement logic for determining which cache line in the cache is both the oldest and not dirty; and cache control logic for replacing that cache line determined to be both the oldest and not dirty, wherein the replacement logic further determines if all cache lines in the cache are dirty, wherein the cache control logic will then replace the oldest cache line in the cache that is currently on page.

6. The system as recited in claim 5, wherein the replaced cache line that is on page is also on bank.

7. A data processing system comprising:

a processor initiating a replacement of a cache line in a cache coupled to the processor with a new cache line;

replacement logic for determining which cache line in the cache is both the oldest and not dirty; and cache control logic for replacing that cache line determined to be both the oldest and not dirty, wherein the replacement logic further determines if all the cache lines are not dirty and not on page, wherein the cache control logic will then replace the least recently used cache line.

8. A method for rasterizing a pixel onto a display coupled to a processor, comprising the steps of:

comparing an address of the pixel to addresses in a cache coupled to the processor;

if there is a cache miss, retrieving the pixel data from memory;

determining if the cache is full;

if the cache is not full, inserting a cache line containing the pixel data into the cache;

if the cache is full, determining if the cache contains any cache lines that have been written back to the memory;

if the cache contains one or more cache lines that have been written back to the memory, selecting the oldest of these one or more cache lines;

replacing the oldest of these one or more cache lines with the cache line containing the pixel data;

if all the cache lines in the cache are dirty, determining the oldest cache line in the cache that is currently on page and on bank; and replacing the oldest dirty cache line in the cache that is currently on page and on bank.

9. The method as recited in claim 8, further comprising the step of:

if all the cache lines in the cache are dirty, but none are on page and on bank, replacing a cache line using an LRU method.

\* \* \* \* \*